United States Patent [19]

Blazejewski

[11] Patent Number: 5,833,938
[45] Date of Patent: Nov. 10, 1998

[54] INTEGRATED VOC ENTRAPMENT SYSTEM FOR REGENERATIVE OXIDATION

[75] Inventor: Edward G. Blazejewski, Greenbay, Wis.

[73] Assignee: Megtec Systems, Inc., DePere, Wis.

[21] Appl. No.: 650,280

[22] Filed: May 20, 1996

[51] Int. Cl.⁶ ............................. F01N 3/08; F01N 3/10
[52] U.S. Cl. .................... 422/175; 422/168; 422/169; 422/173; 422/176; 422/171; 422/198
[58] Field of Search .................... 422/168, 169, 422/173, 176, 198, 175, 171; 432/182; 431/5

[56] References Cited

U.S. PATENT DOCUMENTS

| | | |
|---|---|---|
| 308,518 | 11/1884 | Pew . |
| 343,865 | 6/1886 | Swindell ............................ 423/181 |
| 571,250 | 11/1896 | Talbot . |
| 732,939 | 7/1903 | Herrick . |
| 817,099 | 4/1906 | Benjamin . |
| 828,283 | 8/1906 | Ghrist ................................ 432/181 |
| 1,045,650 | 11/1912 | Weiss . |
| 1,279,697 | 9/1918 | Hook ................................. 432/181 |
| 1,462,540 | 7/1923 | Festa . |
| 1,606,927 | 11/1926 | Dyrssen . |
| 2,098,553 | 11/1937 | Reiner ................................... 277/6 |
| 2,742,275 | 4/1956 | Allen .................................... 263/15 |
| 3,207,493 | 9/1965 | Swain .................................. 263/15 |
| 3,870,474 | 3/1975 | Houston ............................... 23/277 |
| 3,895,918 | 7/1975 | Mueller ............................... 23/277 |
| 4,342,333 | 8/1982 | Mizuno et al. ................ 137/625.44 |
| 4,398,590 | 8/1983 | Leroy ..................................... 165/4 |
| 4,650,414 | 3/1987 | Grenfell ................................. 431/5 |
| 4,741,690 | 5/1988 | Heed ..................................... 431/7 |
| 4,828,483 | 5/1989 | Finke ................................... 431/11 |
| 4,842,016 | 6/1989 | McKenzie ........................... 137/597 |
| 4,850,862 | 7/1989 | Bjerklie .............................. 432/182 |
| 4,856,492 | 8/1989 | Kawamoto ........................ 126/91 A |
| 4,870,947 | 10/1989 | Kawamoto ........................ 126/91 A |
| 5,024,817 | 6/1991 | Mattison ............................. 422/111 |
| 5,134,945 | 8/1992 | Reimlinger et al. ................ 110/304 |
| 5,161,968 | 11/1992 | Nutcher et al. ..................... 432/179 |
| 5,209,401 | 5/1993 | Fiedrich ............................... 237/8 C |
| 5,293,827 | 3/1994 | Nester et al. ....................... 110/304 |
| 5,297,954 | 3/1994 | Colagiovanni .......................... 431/5 |
| 5,309,851 | 5/1994 | Reimlinger et al. ................ 110/304 |
| 5,376,340 | 12/1994 | Bayer et al. ........................ 422/175 |
| 5,422,077 | 6/1995 | Bayer .................................. 422/109 |
| 5,431,147 | 7/1995 | Tanaka et al. ...................... 431/170 |

*Primary Examiner*—Stephen Walsh
*Assistant Examiner*—Michael Pak
*Attorney, Agent, or Firm*—Mitchell D. Bittman; Kevin S. Lemack

[57] ABSTRACT

Regenerative thermal oxidizer in which a gas such as contaminated air is first passed through a hot heat-exchange bed and into a communicating high temperature oxidation (combustion) chamber, and then through a relatively cool second heat exchange bed. The apparatus includes a number of internally insulated, ceramic filled heat recovery columns topped by an internally insulated combustion chamber. Process air is fed into the oxidizer through an inlet manifold containing a number of hydraulically or pneumatically operated flow control valves (such as poppet valves). The air is then directed into the heat exchange media which contains "stored" heat from the previous recovery cycle. The process air is heated to near oxidation temperatures. Oxidation is completed as the flow passes through the combustion chamber, where one or more burners are located. The gas is maintained at the operating temperature for an amount of time sufficient for completing destruction of the VOC's. From the combustion chamber, the gas flows vertically downward through another column containing heat exchange media, thereby storing heat in the media for use in a subsequent inlet cycle when the flow control valves reverse. The resulting clean air is directed via an outlet valve through an outlet manifold and released to atmosphere at a slightly higher temperature than inlet, or is recirculated back to the oxidizer inlet. An integrated VOC entrapment chamber entraps any VOC's that leak out during cycling, and recycles them back to the oxidizer inlet for further processing.

4 Claims, 2 Drawing Sheets

INTEGRATED VOC ENTRAPMENT SYSTEM FOR REGENERATIVE OXIDATION

BACKGROUND OF THE INVENTION

The control and/or elimination of undesirable impurities and by-products from various manufacturing operations has gained considerable importance in view of the potential pollution such impurities and by-products may generate. One conventional approach for eliminating or at least reducing these pollutants is by oxidizing them via incineration. Incineration occurs when contaminated air containing sufficient oxygen is heated to a temperature high enough and for a sufficient length of time to convert the undesired compounds into harmless gases such as carbon dioxide and water vapor.

In view of the high cost of the fuel necessary to generate the required heat for incineration, it is advantageous to recover as much of the heat as possible. To that end, U.S. Pat. No. 3,870,474 discloses a thermal regenerative oxidizer comprising three regenerators, two of which are in operation at any given time while the third receives a small purge of purified air to force out any untreated or contaminated air therefrom and discharges it into a combustion chamber where the contaminants are oxidized. Upon completion of a first cycle, the flow of contaminated air is reversed through the regenerator from which the purified air was previously discharged, in order to preheat the contaminated air during passage through the regenerator prior to its introduction into the combustion chamber. In this way, heat recovery is achieved.

Similarly, U.S. Pat. No. 3,895,918 discloses a thermal regeneration system in which a plurality of spaced, non-parallel heat-exchange beds are disposed toward the periphery of a central, high-temperature combustion chamber. Each heat-exchange bed is filled with heat-exchanging ceramic elements. Exhaust gases from industrial processes are supplied to an inlet duct, which distributes the gases to selected heat-exchange sections depending upon whether an inlet valve to a given section is open or closed.

It would be desirable to eliminate one of the three regenerative sections without a significant sacrifice in efficacy and efficiency. However, a major drawback of so-called "two can" regenerative thermal oxidizers is leakage to ambient of unprocessed gas during cycling. Since the leaked gas is not incinerated, such leakage reduces the overall efficiency of the apparatus.

It is therefore an object of the present invention to provide a two can regenerative thermal oxidizer which minimizes or prevents leakage of unpurified effluent.

It is a further object of the present invention to provide a two can regenerative thermal oxidizer which minimizes or prevents leakage of unpurified effluent in an economically efficient manner.

It is a still further object of the present invention to provide a compact, integrated regenerative thermal oxidizer.

SUMMARY OF THE INVENTION

The problems of the prior art have been solved by the present invention, which provides a regenerative thermal oxidizer in which a gas such as contaminated air is first passed through a hot heat-exchange bed and into a communicating high temperature oxidation (combustion) chamber, and then through a relatively cool second heat exchange bed. The apparatus includes a number of internally insulated, ceramic filled heat recovery columns topped by an internally insulated combustion chamber. Process air is fed into the oxidizer through an inlet manifold containing a number of hydraulically or pneumatically operated flow control valves (such as poppet valves). The air is then directed into the heat exchange media which contains "stored" heat from the previous recovery cycle. As a result, the process air is heated to near oxidation temperatures. Oxidation is completed as the flow passes through the combustion chamber, where one or more burners are located. The gas is maintained at the operating temperature for an amount of time sufficient for completing destruction of the VOC's. Heat released during the oxidation process acts as a fuel to reduce the required burner output. From the combustion chamber, the air flows vertically downward through another column containing heat exchange media, thereby storing heat in the media for use in a subsequent inlet cycle when the flow control valves reverse. The resulting clean air is directed via an outlet valve through an outlet manifold and released to atmosphere at a slightly higher temperature than inlet, or is recirculated back to the oxidizer inlet. Situated on top of the combustion chamber is a VOC entrapment chamber that entraps any VOC's that leak out during cycling.

BRIEF DESCRIPTION OF THE DRAWINGS

FIG. 2 is a side view of the regenerative thermal oxidizer of FIG. 1; and.

DETAILED DESCRIPTION OF THE INVENTION

With regenerative thermal oxidation technology, the heat transfer zones must be periodically regenerated to allow the heat transfer media (generally a bed of ceramic stoneware) in the depleted energy zone to become replenished. This is accomplished by periodically alternating the heat transfer zone through which the cold and hot fluids pass. Specifically, when the hot fluid passes through the heat transfer matrix, heat is transferred from the fluid to the matrix, thereby cooling the fluid and heating the matrix. Conversely, when the cold fluid passes through the heated matrix, heat is transferred from the matrix to the fluid, resulting in cooling of the matrix and heating of the fluid. Consequently, the matrix acts as a thermal store, alternately accepting heat form the hot fluid, storing that heat, and then releasing it to the cold fluid.

The alternating of the heat transfer zones to provide matrix regeneration is accomplished via regenerative thermal oxidizer switching valves. In the preferred embodiment of the present invention, there is one switching valve per heat transfer zone, and preferably the switching valves are pneumatic poppet type valves whose switching frequency or cycle is a function of volumetric flow rate. While the switching valves provide the means for matrix regeneration, the act of regeneration in itself results in a short duration emission of untreated fluid direct to atmosphere, causing a lowering of the volatile organic compound (VOC) destruction efficiency, and in cases involving high boiling point VOC's, potential opacity issues. To improve the VOC destruction efficiency and eliminate opacity issues resulting from matrix regeneration, the untreated fluid can be diverted away from the oxidizer stack and directed into a "holding vessel" or VOC entrapment chamber. The function of the entrapment chamber is to contain the slug of untreated fluid which occurs during the matrix regeneration process long enough so that the majority of it can be slowly recycled (i.e., at a very low flow rate) back to the inlet of the oxidizer for treatment. The untreated fluid in the entrapment chamber must be entirely evacuated and recycled back to the oxidizer inlet within the time frame allotted between matrix regeneration cycles since the process must repeat itself for all subsequent matrix regenerations.

Figure 1:
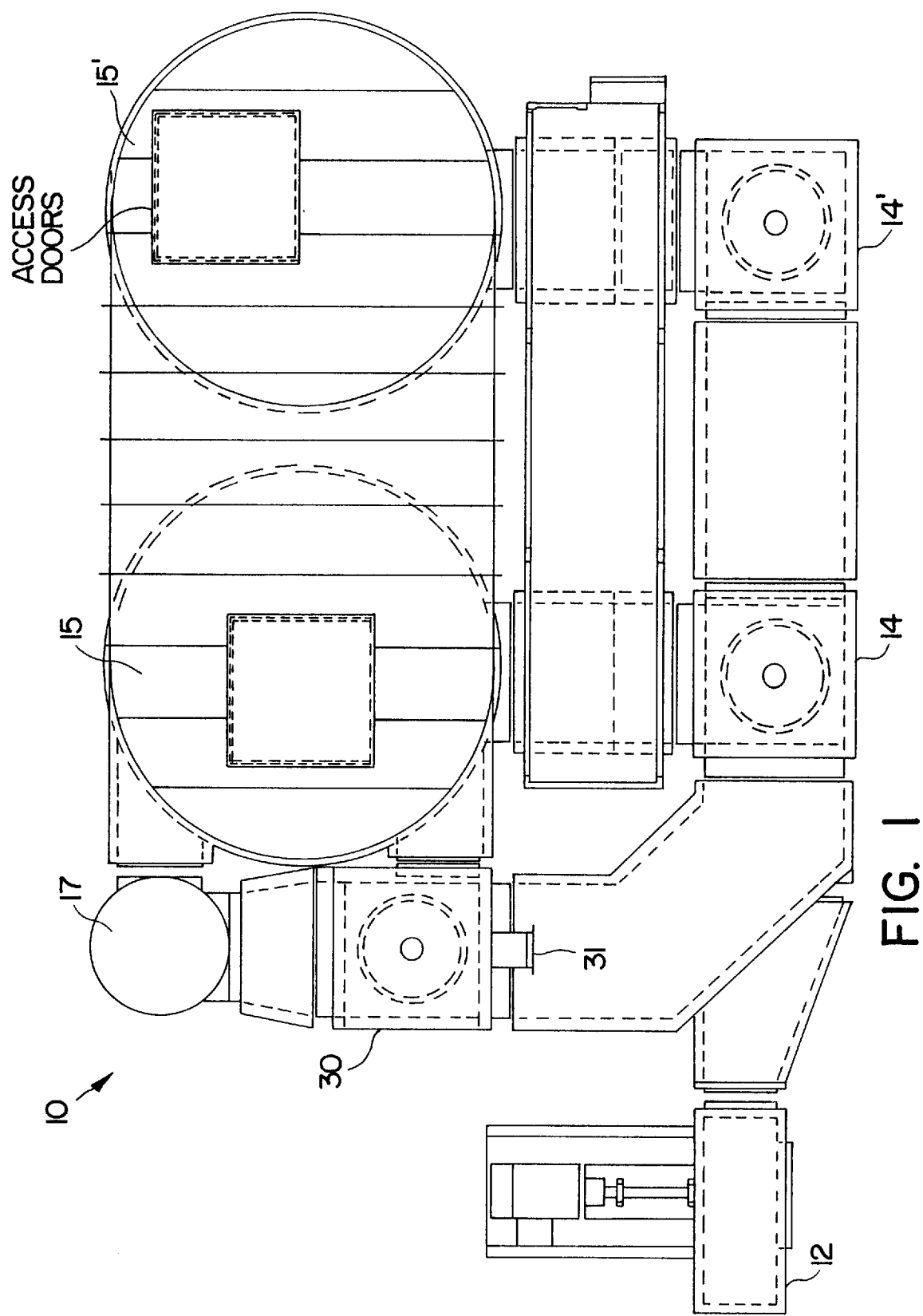
FIG. 1 is a top view of a regenerative thermal oxidizer in accordance with the present invention.
Figure 2:
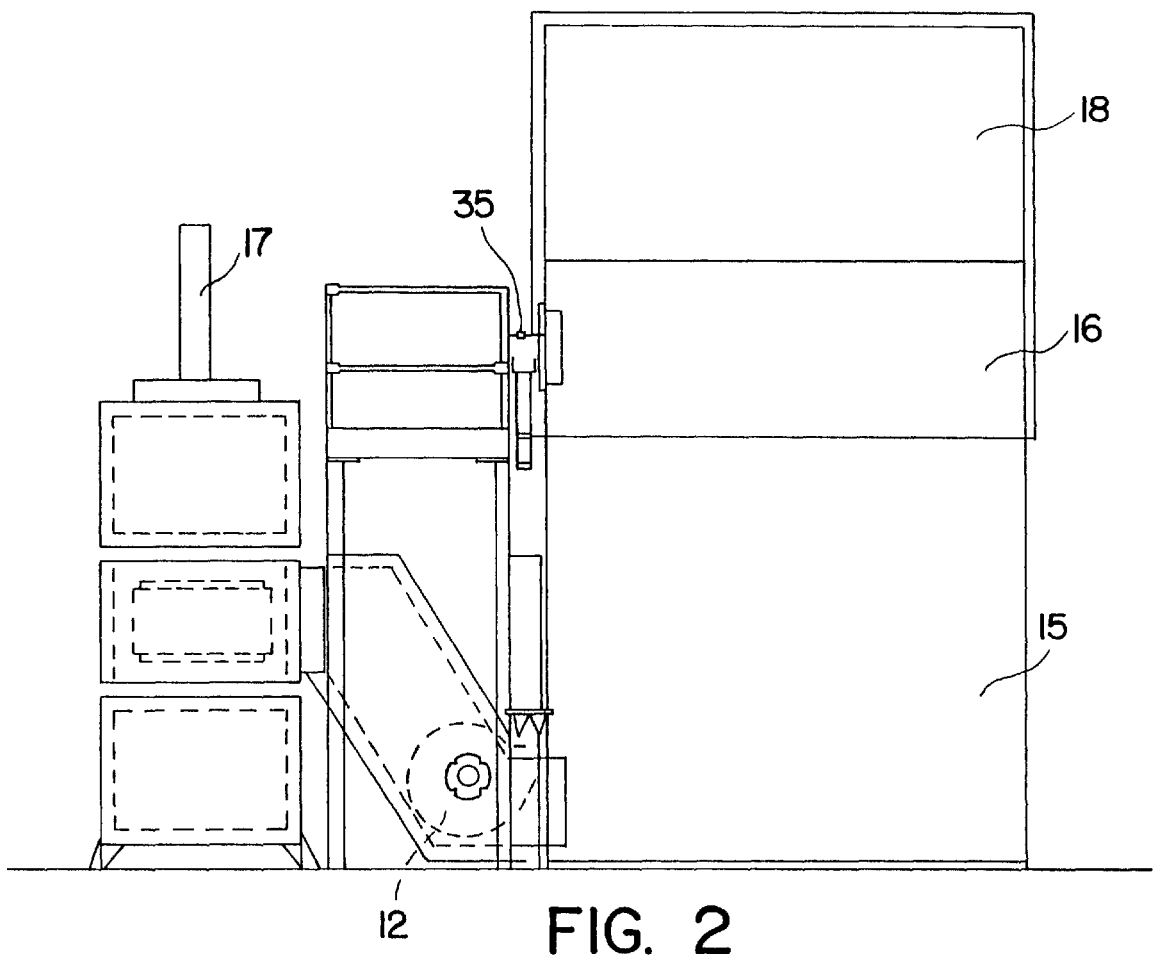

Turning first to FIG. 1, there is shown generally at 10 a two can regenerative thermal oxidizer. A forced draft direct drive fan 12 directs the gas to be processed into suitable ductwork, through pneumatic poppet valves 14, 14', and into (or out of) ceramic stoneware-filled regenerative heat exchange columns 15, 15'. A combustion chamber 16 (FIG. 2) having associated heating means such as one or more gas-fired burners is in communication with and is positioned over each regenerative heat exchange column 15, 15', and is also in communication with an exhaust stack 17 that discharges combusted gases to atmosphere.

Integrated directly on top of the combustion chamber 16 is an entrapment chamber 18. The roof of the combustion chamber 16 also serves as the floor of the entrapment chamber 18, resulting in a compact, integrated design. Preferably the shape of the entrapment chamber 18 follows the same contour as the combustion chamber 16, and therefore has the same length and width. The height of the entrapment chamber 18 is higher than that of the combustion chamber, since it is dependent on different criteria. Specifically, the height of the combustion chamber is a function of fluid velocity, whereas the height of the entrapment chamber is a function of untreated fluid volume, pressure drop, untreated fluid temperature, and dwell time. For example, the entrapment chamber height can be 72 inches at an untreated fluid temperature of 100° F., and 96 inches at an untreated fluid temperature of 350° F. The untreated fluid volume is in turn directly related to the size of the oxidizer heat exchanger matrix, the matrix void volume, the switching valve switch time, and the size of the switch valve to heat exchanger zone connecting ductwork. To insure that the entrapment chamber size is adequate, the chamber is preferably sized to contain a volume which is approximately 1.5 times greater than the untreated fluid volume. A flush return poppet valve 30 and associated flush return ductwork 31 recycle the fluid in the entrapment chamber 18 back to the oxidizer inlet.

In addition to its volume capacity, the design of the entrapment chamber 18 internals is critical to its ability to contain and return the untreated fluid back to the oxidizer inlet for treatment within the time allotted between heat exchanger matrix regeneration cycles. Any untreated volume not properly returned within this cycle will escape to atmosphere via the exhaust stack 17, thereby reducing the effectiveness of the entrapment device, and reducing the overall efficiency of the oxidizer unit.

Figure 3:
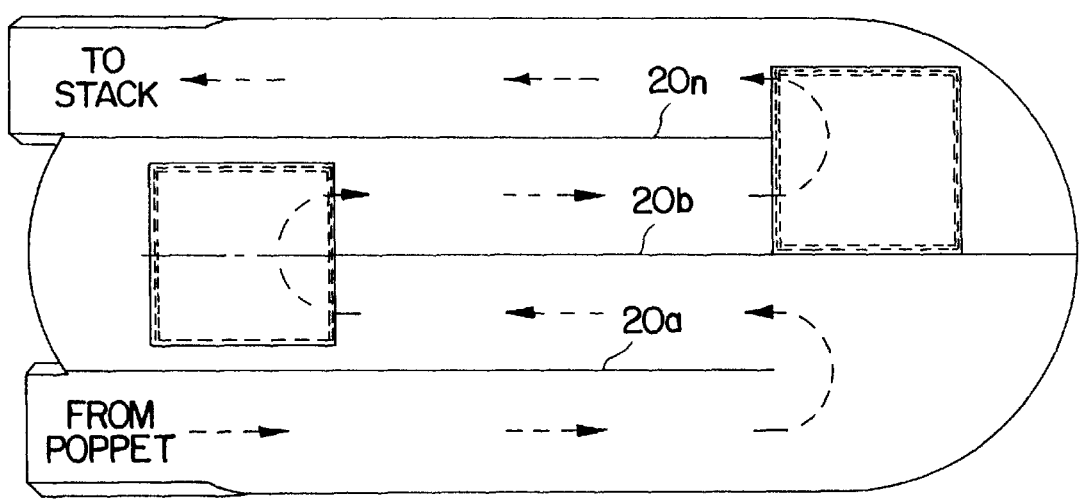
FIG. 3 is a top view of a VOC entrapment chamber in accordance with the present invention.

Turning now to FIG. 3, there is shown a schematic top plan view of the entrapment chamber 18. A plurality of splitter plates 20a–20n running from top to bottom are located in the chamber 18 and divide the entrapment chamber 18 into a tortuous or meandering fluid flow pattern. Preferably an even number of meandering flow paths are created by the splitter plates so that the entrapment chamber inlet and outlet connections are on the same side of the oxidizer unit, which keeps the entrapment chamber 18 outlet on the same side of the oxidizer unit as the exhaust stack 17 to which it is connected (since it must be under atmospheric pressure to allow for evacuation of the fluid contained within it), making for a very compact design. The number of meandering flow paths is restricted not only by the physical size of the chamber 18, but also by the resulting fluid pressure drop; a minimum fluid pressure drop is desired. Thus, the number and cross sectional area of the paths within the meandering flow patterns are preferably designed for a maximum fluid pressure drop of 2.0" w.c., and for a fluid velocity of approximately 39.0 acfm (at 100° F. to 350° F.) with a corresponding minimum dwell time of 3.0 seconds. Preferably six meandering flow paths are created. The meandering flow paths effectively lengthen the chamber so as to create a plugged flow design by increasing the dwell time of the fluid within the chamber 18.

In operation, once the combustion chamber and associated heat exchanger matrix of each of the two energy recovery columns are heated up to the required temperature such as by a gas-fired burner in the combustion chamber (associated burner piping 35 being shown in FIG. 2), the untreated process exhaust is directed into the oxidizer for treatment. The cooler untreated process exhaust passes first through one of the heat recovery columns and in so doing, is preheated via convective heat transfer with the hotter matrix heat exchanger. It is this preheating or energy transfer which provides the high degree of thermal efficiency associated with regenerative thermal recovery. Upon exiting the matrix wherein a major portion of the oxidation has already been initiated, the process fluid enters the burner-fired combustion chamber 16 where oxidation of the untreated fluid is completed. Upon exiting the combustion chamber 16, the treated fluid now passes through the second heat recovery column where the hotter fluid now transfers heat back to the cooler matrix.

Periodically, the untreated process exhaust must alternative heat recovery columns in order to maintain the thermal efficiency via regeneration of the respective heat exchanger matrix. During heat exchanger matrix regeneration, untreated flow (1) residing within the matrix void volume of the matrix which has just changed from the ingoing matrix preheating the process gas to the outgoing matrix now under going regeneration; (2) residing in the poppet valve to matrix connecting duct of the outgoing matrix under regeneration; (3) residing in the oxidizer poppet valve inlet manifold; and (4) passing through the poppet valves during the valve switching cycle, is directed into the entrapment chamber 18 in order to minimize its escape to atmosphere. In order to be able to pull the untreated flow out of the entrapment chamber 18 to be recycled to the oxidizer, the entrapment chamber 18 must be under atmospheric pressure, and is thus in communication with the exhaust stack 17. The suction side of the forced draft fan 12 creates a 3.0" w.c. suction pressure at its inlet, which not only helps to transport the untreated process flow from its source to the oxidizer, but also is used to overcome the exhaust stack draft and evacuate the untreated flow from the entrapment chamber 18 and return it to the oxidizer fan inlet. The meandering flow pattern effectively lengthens the chamber 18, and thereby increases the untreated fluid dwell time in the chamber 18. The larger the chamber volume capacity, and the longer the dwell time, the better the recycle-to-escape ratio of the untreated fluid. The time available to completely empty the entrapment chamber 18 is limited, and is dictated by the time duration between valve switches for matrix regeneration, which is generally about 240 seconds. Any untreated fluid in the entrapment chamber 18 that is not recycled escapes to atmosphere through the exhaust stack 17 via natural stack draft. The untreated flow in the entrapment chamber 18 must be returned to the oxidizer at a small volumetric flow rate (i.e., at a rate of approximately 2.0% of the total process exhaust flow rate entering the oxidizer) so that the size and electrical consumption of the oxidizer is not adversely affected.

What is claimed is:

1. Apparatus for treating volatile organic components of a process gas, comprising:

first and second heat exchanger columns, each column containing heat exchange media and having a gas inlet, a gas outlet being in communication with a combustion chamber, said combustion chamber having a top;

heating means in said combustion chamber for producing or maintaining a high temperature range therein;

valve means in communication with said first and second heat exchanger columns for alternately directing said process gas into one or the other of said first and second heat exchanger columns;

an entrapment chamber for receiving untreated process gas when said valve means is actuated, said entrapment chamber having an inlet in communication with said valve means, and an outlet, said entrapment chamber having a bottom, said bottom of said entrapment chamber being said top of said combustion chamber, said entrapment chamber including means for causing gas flowing from said inlet to said outlet to follow a tortuous path therebetween; and an exhaust stack open to atmosphere and in communication with said entrapment chamber.

2. The apparatus of claim 1, wherein said valve means directs said process gas into one of said columns as a function of the temperature of said heat exchange media therein.

3. The apparatus of claim 1, wherein said means for causing gas flowing from said inlet to said outlet to follow a tortuous path comprises a plurality of splitter plates dividing said entrapment chamber into a plurality of meandering flow paths between said entrapment chamber inlet and outlet.

4. The apparatus of claim 3, wherein there are an even number of said meandering flow paths.

\* \* \* \* \*